June 7, 1927.
W. V. JOHNSON ET AL
1,631,320
MINE CAR
Filed Feb. 26, 1926
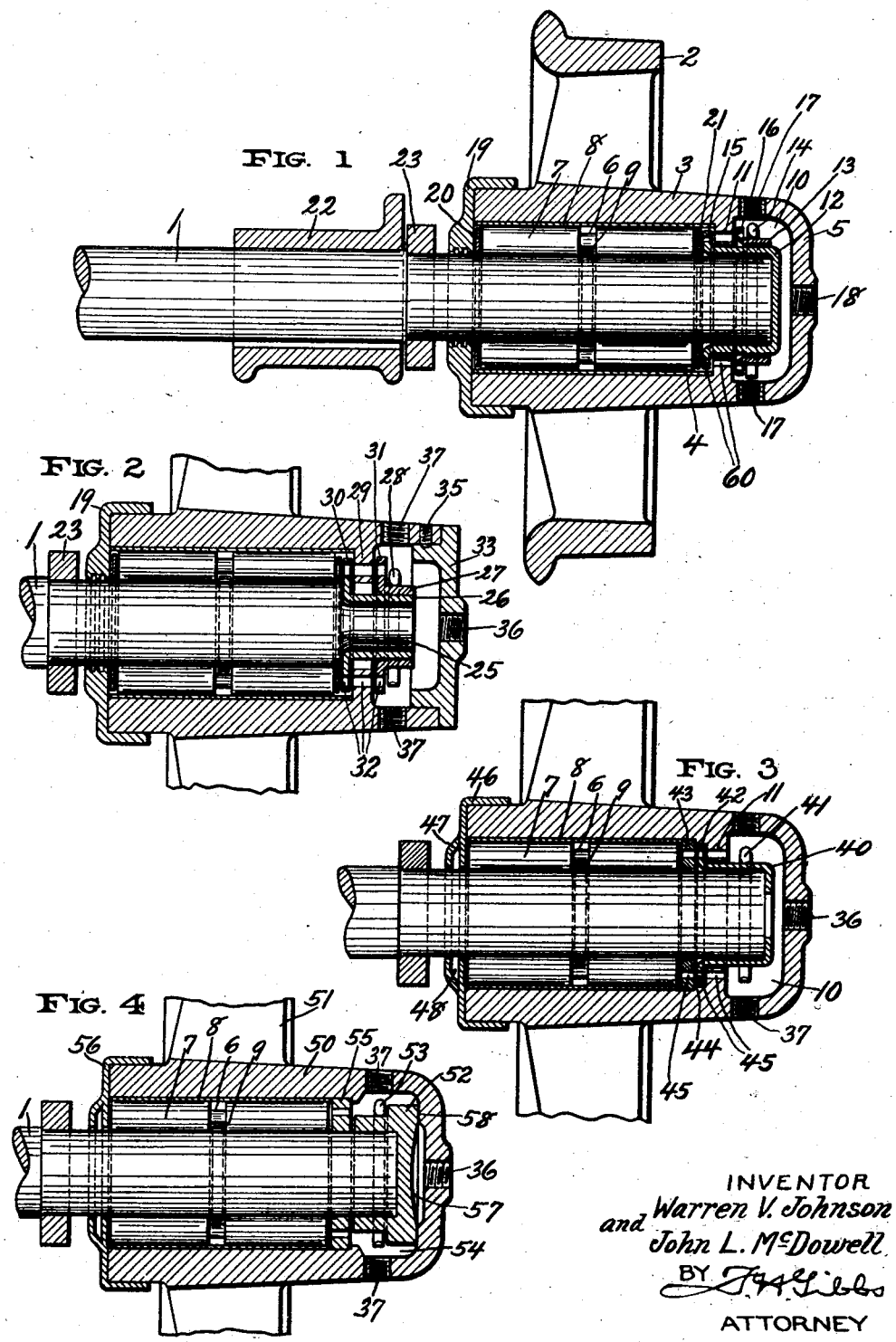
INVENTOR
Warren V. Johnson
and John L. McDowell
BY
ATTORNEY Patented June 7, 1927.

1,631,320

UNITED STATES PATENT OFFICE.

WARREN V. JOHNSON, OF BLOOMSBURG, PENNSYLVANIA, AND JOHN L. McDOWELL, OF JERSEY CITY, NEW JERSEY, ASSIGNORS TO AMERICAN CAR AND FOUNDRY COMPANY, OF NEW YORK, N. Y., A CORPORATION OF NEW JERSEY.

MINE CAR.

Application filed February 26, 1926. Serial No. 90,867.

In the drawings:

Figure 1 is a sectional elevational view of a mine car wheel and axle constructed in accordance with our invention;

Fig. 2 is a sectional elevational view of a mine car wheel showing a modified structure for preventing movement of the wheel along the axle, and Figs. 3 and 4 are sectional elevational views of two other modified wheel structures.

Our invention relates to wheel and axle mountings, being especially adaptable and advantageous for mine cars, and for wheels having the axle opening in the hub closed at the outer end. We aim to hold the wheel securely against movement along the axle, to hold the roller journal bearings (when such are employed) in proper position, to provide for complete enclosure of the bearing surfaces and parts, and to assure good lubricating conditions, and effectual exclusion of dust from all bearings. We also aim to prevent movement of the axle in the axle boxes or housings wherein it is mounted. How these and other advantages can be realized through our invention will appear from our description hereinafter of forms of construction conveniently embodying the invention.

Referring to Figure 1 of the drawing, an axle 1 for a mine car is shown provided with a wheel 2 constructed in accordance with the invention. The wheel 2 comprises a hub 3 having an axle opening 4 therein. The outer end of the axle opening 4 is closed by a cap 5 cast integral with the hub 3. A roller bearing structure 6, which comprises roller bearings 7, a sleeve 8 and a retainer ring 9 is mounted within the opening 4. The axle 1 projects through the roller bearing structure 6 and into a chamber 10 formed in the end of the wheel hub. An internal flange, ridge, shoulder or collar 11 projects from the hub 3 into the chamber 10 and affords oppositely facing shoulders for engaging a thrust cap 12 and a thrust washer 13 secured to the wheel axle to prevent movement of the wheel in either direction on the axle. The thrust cap and the thrust washer are secured to the axle by means of a linch pin 14.

The thrust cap 12 is provided with a flange 15 located on one side of the shoulder 11 and the thrust washer 13 is provided with a flange 16 located on the other side of the shoulder 11. The two flanges of the thrust cap and the thrust washer being located on opposite sides of the shoulder 11 serve to insure against movement of the wheel along the axle in either direction. It should be noted the bearing surfaces between the thrust cap and the shoulder at 11 and the thrust washer and the shoulder at 11 are located near the periphery or wheel hub wall of the axle opening, to insure the thrust bearing surfaces being supplied with lubricating material. It is of course apparent that the lubricant within the wheel hub will tend to collect around the wall of the axle opening. In constructing the structure shown in Fig. 1 it is preferable to cast the thrust washer 13 within the chamber 10. Openings 60 are provided in the collar or shoulder 11 and flanges 15 and 16 for passage of lubricant.

The wheel hub is provided with openings 17 for inserting the pin 14 in position, and with an opening 18 for introducing lubricant. A cap 19 is secured to the inner side of the wheel hub in any suitable manner and surrounds the axle 1 to serve as a dust guard. A washer 20 is provided between the cap 19 and one end of the rollers for holding them in position against a washer 21 which is located adjacent the flange 15 on the thrust cap 12. The cap 19 thus serves to hold the rollers in position, to retain lubricant within the bearing structure and to prevent the admission of dust to the axle opening in the hub.

An axle box 22 is provided on the axle adjacent to a collar 23. The collar 23 is shrunk or pressed on the axle adjacent to the box 22 and serves to prevent longitudinal movement of the axle in the box. Thus the means for preventing longitudinal movement of the axle in the boxes is independent of the means for preventing longitudinal movement of the wheels on the axle.

In the modification disclosed in Fig. 2, as also in Figs. 3 and 4, of the drawing similar parts will be indicated by like reference characters. The wheel structure disclosed in Fig. 2 with the exception of the means for preventing movement of the wheel along the axle and the cap secured to the end of the hub is similar to the wheel structure shown in Fig. 1. The axle 1 shown in Fig. 2 or the drawing is provided with a reduced portion 25 upon which is mounted a thrust cap 26 and a thrust washer 27. The thrust cap and the thrust washer are held in position by a linch pin 28 in the same manner as the thrust collar and thrust washer shown in Fig. 1. A shoulder, collar or flange 29 which projects from the hub of the wheel into the axle opening is disposed between two flanges 30 and 31, respectively on the thrust cap and the thrust washer. Openings 32 are provided through the collar or shoulder 29 and the flanges 30 and 31 for admitting lubricant to the roller bearings. The outside end of the hub is provided with a cap 33 which is preferably secured to the body portion of the hub by means of a set screw 35. The cap is provided with an opening 36 therethrough for the admission of lubricant and the hub is provided with openings 37 for mounting the linch pin in position. The thrust cap 26 does not cover the end of the axle as the thrust cap 12 shown in Fig. 1 and the thrust washer 27 is not cast with the wheel.

Referring to Fig. 3 of the drawing, a roller bearing structure similar to the roller bearing structure shown in Fig. 1 is mounted in a wheel and hub similar to that shown in Fig. 1. The axle projects through the roller bearing structure into the chamber 10 in the wheel hub and carries a thrust cap 40. The trust cap 40 is held in position by a linch pin 41 and is provided with a flange 42 disposed between a washer or collar 43 and the collar or shoulder 11 in the hub. The washer 43 is pressed into position in the axle opening in the hub and engages a shoulder 44. The flange 42 on the thrust cap is thus held between the washer 43 and the shoulder or collar 11 and serves to prevent movement of the wheel in either direction along the axle. The shoulder 11, the flange 42 and the washer 43 are provided with openings 45 therethrough for admitting lubricant. A cap 46 is secured to the inner end of the wheel hub and surrounds the axle adjacent to the inner end of the roller bearings. The washer or collar 43 may be held in place against the shoulder 44 not only by its own tight fit in the internal bore of the hub, but also by the sleeve or liner 8, which is held by friction as well as by the cap 46 at the inner end of the hub. Such cap 46 has an auxiliary cap 47 preferably spot welded thereto for forming an open space 48 to collect lubricating material.

In the wheel structure shown in Fig. 4 of the drawing, a roller bearing structure similar to that shown in Fig. 1 is mounted within the hub 50 of a wheel 51. The roller bearing structure is herein indicated by the same reference characters used when discussing the parts thereof in describing Fig. 1. The wheel axle 1 which projects through the roller bearing structure carries a cap 52 which is held in position on the end of the axle by means of a linch pin 53. The cap 52 may be cast with the wheel within a chamber 54 formed within the hub. A shouldered collar or washer 55 is provided in the axle opening adjacent to the thrust cap 52. Such washer may, if so desired, be cast as a shoulder on the wheel hub as shown in Figs. 1, 2 and 3. If the washer 55 is formed separately and not cast with the hub, it may be preferable to form it as a split ring and force the same in position. The inner end of the hub is provided with a cap 56 which is similar to the cap 46 shown in Fig. 3 of the drawing. The collar or washer 55 may be held in place not only by its own tight fit in the internal bore of the hub 50, but also by the sleeve 8 and the cap 56.

The central portion of the thrust cap 52 is cut away at 57 and the corresponding portion of the closure for the end of the axle opening in the hub is cut away to insure a bearing surface between the hub and the cap near the rim of the cap. Thus it is apparent that a thrust surface 58 is formed on the thrust cap which takes care of the thrust in one direction. The thrust in the opposite direction is taken up by the washer 55 engaging the end portion of the cap.

What is claimed is:

1. In combination, a wheel having a hub with an axle opening therein means closing said opening at one end, an axle projecting into said opening, and means comprising thrust members detachably secured against rotation on the axle within said opening for preventing movement of the wheel along the axle in either direction, said thrust members having bearing surfaces located near the wall forming the axle opening in the hub and engaging at opposite sides of a part carried by the hub independently of said closing means.

2. In combination, a wheel having a hub with an axle opening therein closed at one end, an axle projecting into said opening, a shoulder formed on the hub within the axle opening, and thrust members secured against rotation on the axle within said opening for engaging said shoulder to limit the movement of the wheel on the axle in either direction.

3. In combination, a wheel having a hub with an axle opening therein, an axle projecting into said opening, a shoulder formed on the hub within the axle opening, and thrust members secured against rotation on the axle near the end thereof within said opening for engaging opposite sides of said shoulder to limit the movement of the wheel on the axle in either direction.

4. In combination, a wheel having a hub with an axle opening therein, a shoulder formed on the hub within the axle opening, a roller bearing structure mounted in the opening in said hub, an axle projecting through said roller bearing structure, means detachably secured near to the end of the axle within said opening and held against rotation thereon, said means engaging said shoulder for preventing movement of the wheel along the axle in either direction, an axle box, and a collar secured to the axle adjacent to the box and independent of the wheel.

5. In combination, a wheel having a hub with an axle opening therein closed at one end, a shoulder formed on the hub within the axle opening, a roller bearing structure mounted in the opening in said hub, an axle projecting through said bearing structure, a thrust cap structure secured to the axle within the opening and cooperating with said shoulder for limiting the movement of the wheel towards the near end of the axle.

6. In combination, a wheel having a hub with an axle opening therein, a roller bearing structure mounted in said axle opening, a shoulder formed on the hub and projecting from the hub into said opening, and means detachably secured against rotation on said axle within the opening for engaging opposite sides of said shoulder to prevent movement of the wheel along the axle.

7. In combination, a wheel having a hub with an axle opening therein, a roller bearing structure mounted on the hub within said opening, an axle projecting through said bearing structure, means comprising a structure secured to the axle within the opening for preventing movement of the wheel along the axle in either direction, an axle box carried by axle, and a collar secured to the axle adjacent to the box to prevent longitudinal movement of the axle.

8. In combination, a wheel having a hub with an axle opening therein, a roller bearing structure mounted on the hub within said opening, a shoulder on said hub projecting into said axle opening, an axle projecting through said roller bearing structure, means comprising thrust members secured to the axle for engaging the shoulder on the hub in said opening to limit the movement of the wheel along the axle, an axle box, and a collar secured to the axle adjacent to the box.

9. In combination, a wheel having a hub with an axle opening therein, a roller bearing structure carried by said hub in the opening, an axle projecting through said bearing structure, a cap mounted on the inner side of the hub adjacent to one end of the bearing structure and surrounding the axle, a shoulder projecting from the hub into the opening adjacent the opposite end of the roller bearing structure, and means secured near to the end of the axle within said opening for engaging opposite sides of said shoulder to prevent movement of the wheel along the axle in either direction.

10. In combination, a wheel having a hub with an axle opening therein closed at the outer end, a roller bearing structure mounted in said opening, a dust cap secured to the inner side of the hub adjacent one end of the bearing structure, and means comprising a thrust structure secured to the axle within said opening adjacent the outer end of the roller bearing structure for limiting the movement of the wheel along the axle in either direction.

11. In combination, a wheel having a hub with an axle opening therein, a roller bearing structure mounted in said opening, an axle projecting through said roller bearing, a cap surrounding the axle and secured to the inner side of the hub adjacent one end of the roller bearing structure and means comprising a thrust structure, secured to the axle within said opening for limiting the movement of the wheel along the axle in either direction.

12. In combination, a wheel having a hub with an axle opening closed at one end, a roller bearing structure mounted in said opening, an axle projecting through said roller bearing structure, a shoulder formed on the hub and projecting from the hub into said opening, and thrust members secured against rotation on the axle and located in said opening, said thrust members engaging opposite sides of said shoulder to prevent movement of the wheel along the axle.

13. In combination, a wheel having a hub with an axle opening closed at one end, a shoulder formed on said hub, a roller bearing structure mounted on the hub within said opening, an axle projecting through said roller bearing, and means comprising two thrust members secured against rotation on the axle and engaging the shoulder to prevent movement of the wheel along the axle in either direction.

14. In combination, a wheel having a hub with an axle opening therein, a shoulder formed on said hub, a roller bearing structure mounted in said opening, an axle projecting through said bearing structure, and means comprising a thrust structure secured against rotation on the axle within said opening in the hub for preventing movement of the wheel along the axle in either direction, the bearing surface for said thrust structure being located near the wall of the opening in the hub and engaging said shoulder.

15. In combination, a wheel having a hub with an axle opening, means closing said opening at one end, an axle projecting into said opening in the hub, means contained within the axle opening in the hub and detachably secured against rotation on the axle near the end thereof, means within the axle opening in the hub and rotating with said wheel independently of said closing means, said last mentioned means cooperating with the means on said axle for preventing movement of the wheel along the axle in either direction, said means on said axle being detachable therefrom notwithstanding the closure of the axle opening in the hub.

16. In combination, a wheel having a hub with an axle opening, means closing said opening at one end, an axle projecting into the opening in the hub, means contained within the axle opening in the hub and detachably secured against rotation on the axle and means within the axle opening in the hub and rotating with said hub independently of said closing means, said last mentioned means cooperating with the means on said axle to prevent movement of said wheel along said axle.

In witness whereof I have hereunto set my hand.

WARREN V. JOHNSON.

In witness whereof I have hereunto set my hand.

JOHN L. McDOWELL.